No. 733,255. PATENTED JULY 7, 1903.
M. J. McGILL.
CABLE LUBRICATOR.
APPLICATION FILED OCT. 1, 1902.
NO MODEL. 2 SHEETS—SHEET 1.

WITNESSES:
J. A. Brophy
Walton Harrison

INVENTOR
Michael J. McGill
BY
ATTORNEYS.

No. 733,255. PATENTED JULY 7, 1903.
M. J. McGILL.
CABLE LUBRICATOR.
APPLICATION FILED OCT. 1, 1902.
NO MODEL. 2 SHEETS—SHEET 2.
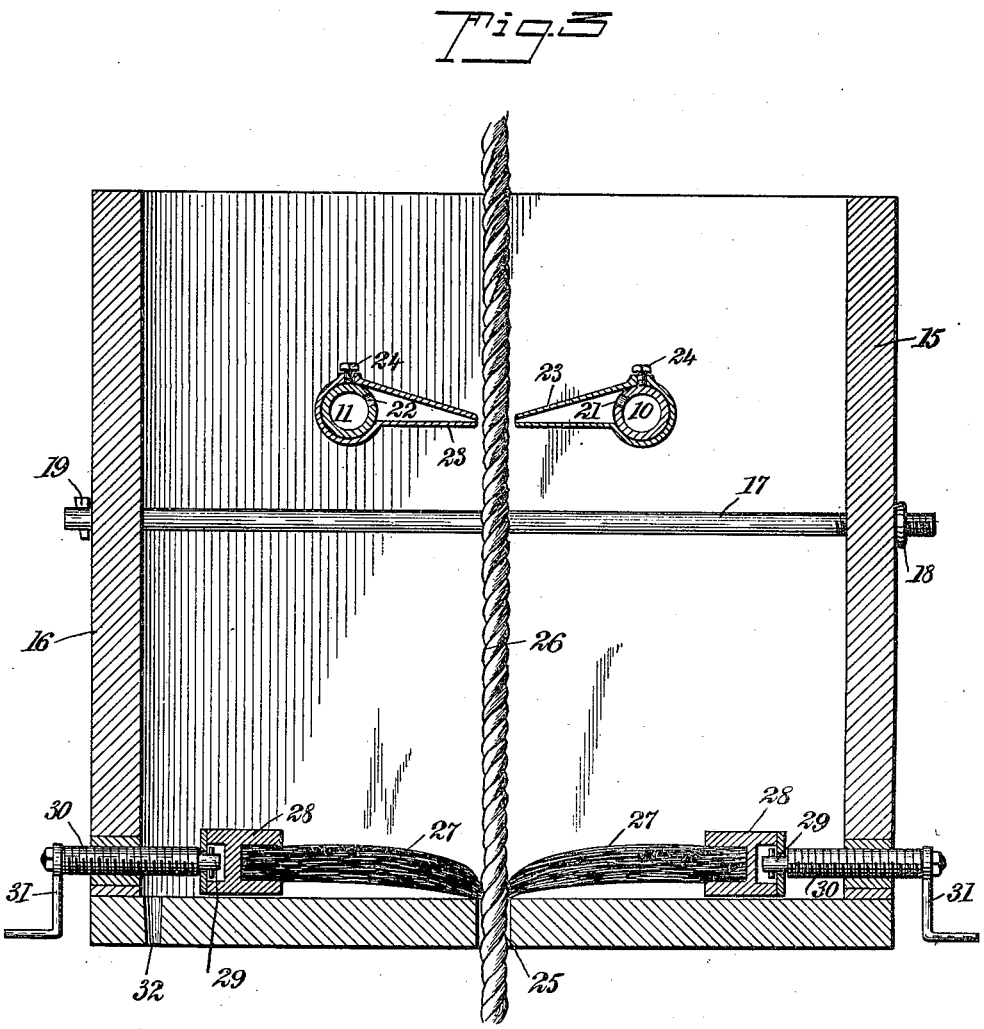
WITNESSES:
INVENTOR
Michael J. McGill
BY
ATTORNEYS.

No. 733,255. Patented July 7, 1903.

UNITED STATES PATENT OFFICE.

MICHAEL J. McGILL, OF PARK CITY, UTAH.

CABLE-LUBRICATOR.

SPECIFICATION forming part of Letters Patent No. 733,255, dated July 7, 1903.

Application filed October 1, 1902. Serial No. 125,526. (No model.)

*To all whom it may concern:*

Be it known that I, MICHAEL J. McGILL, a citizen of the United States, and a resident of Park City, in the county of Summit and State of Utah, have invented new and useful Improvements in Cable-Lubricators, of which the following is a full, clear, and exact description.

My invention relates to the lubrication of cables, wires, ropes, &c., my more particular idea being to produce a portable apparatus suitable for lubricating moving cables.

Reference is to be had to the accompanying drawings, forming a part of this specification, in which similar characters of reference indicate corresponding parts in all the figures.

Figure 1:
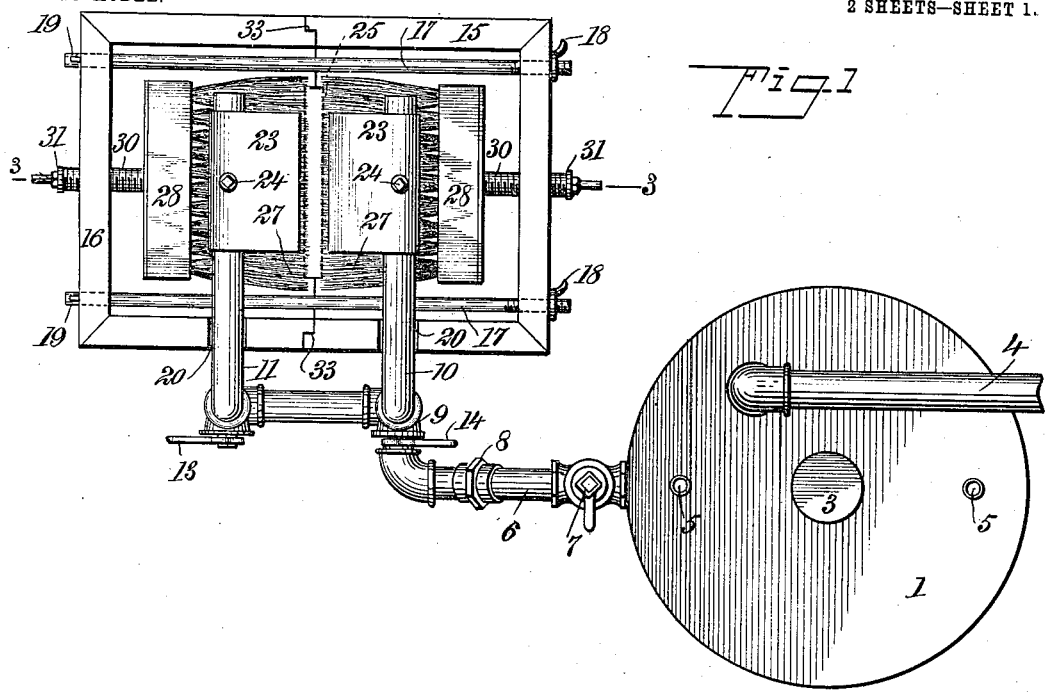
Figure 2:
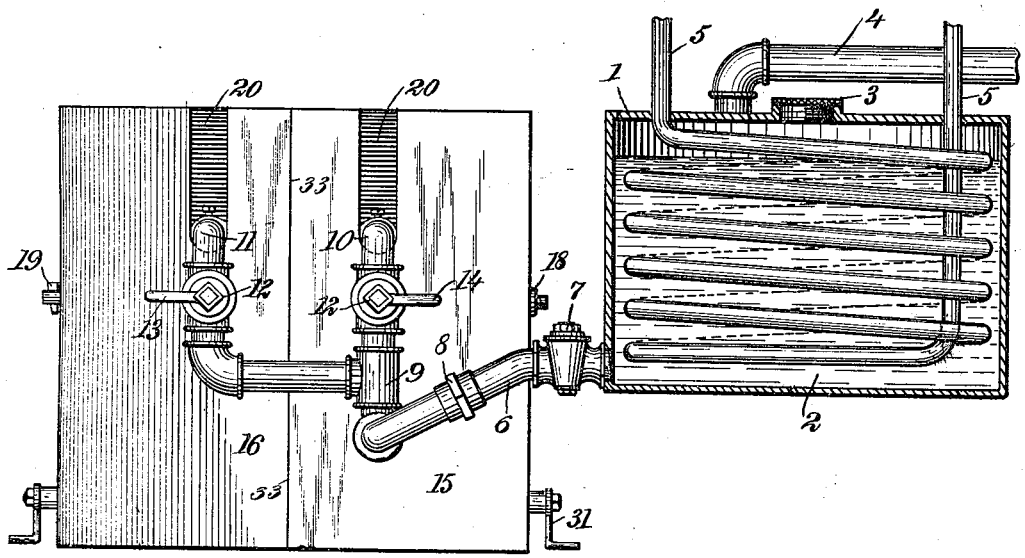

Figure 1 is a plan view of the invention. Fig. 2 is a side elevation of the same, showing certain details in section; and Fig. 3 is an enlarged section upon the line 3 3 of Fig. 1 and showing the invention in use upon a cable.

A tank 1 contains a supply 2 of lubricant and is provided with a removable cap 3, whereby the lubricant may be supplied to the tank in any desired quantity. An air-pipe 4 is connected with the tank 1 and may be used for forcing compressed air into the same for the purpose of ejecting the lubricant therefrom. A coiled pipe 5 is partially disposed within the tank, as shown, for the purpose of heating the lubricant, thereby rendering the same more limpid and penetrating. A pipe 6, which may be of metal, if desired, is provided with a hand-valve 7 and connected with the tank 1. This pipe is provided with a coupling 8 for convenience in setting up the apparatus. Connected with the hose 6 is a T 9, whereby the pipe is virtually divided into two members 10 11. Valves 12, provided with oppositely-disposed hand-levers 13 14, are provided within the two members for the purpose of controlling the supply of lubricant passing through the same.

The frame shown at the upper left-hand portion of Fig. 1 is composed of two halves 15 16, detachably connected together at 33 by means of rods 17, each provided at one end with a key 19 and at the other end with a lever-nut 18. The respective halves are provided with slots 20, as indicated more particularly in Fig. 2. The tubular members 10 11 may be passed readily into these slots and removed therefrom at will. The tubular member 10 is provided with an educt 21, as indicated in Fig. 3, and the tubular member 11 is similarly provided with an educt 22. Mounted upon the tubular members 10 11 are deflecting-hoods 23, each substantially of a wedge shape. These hoods are secured upon the tubular members by means of set-screws 24 and may be moved readily for the purposes of adjustment. The hoods and tubular members together constitute nozzles of a form having some remote resemblance to fishtail nozzles. Preferably the educts 21 22 form an angle relatively to the hoods 23, as indicated in Fig. 3, the purpose of which arrangement is to cause the lubricant in leaving the educts 21 and 22 to be deflected one or more times, and thereby scattered to better advantage.

The cable is shown at 26 and is guided by means of a slot 25 in the frame. (See Fig. 3.) Disposed upon opposite sides of the slot 25 are bristles 27, mounted in blocks 28, these blocks and bristles constituting brushes. The blocks 28 are loosely engaged by the stems 29 of screws 30, which are revoluble by means of handles 31. By rotating the handles 31 the bristles 27 may be forced into engagement with the cable 26 or may be withdrawn from said engagement at will. The bristles may thus be forced with any desired degree of pressure against the cable 26.

The general operation of my device is as follows: The two halves 15 16 of the frame are placed together in the position indicated in Fig. 1, the joint 33 between these halves being stepped, so as to secure them firmly together. The rods 17 are next placed in position and tightened by means of the keys 19 and lever-nuts 18. The pipes being connected with the tank 1 and the lubricant 2 heated by the coil 5, all that is necessary is to force air through the pipe 4 and the work begins. By means of the valve 7 the general supply can be regulated, and the distribution upon different sides is controllable by means of the hand-levers 13 14. The setscrews 24 being properly adjusted, so that the deflecting-hoods 23 are in position to scatter the lubricant, the latter is forced directly upon opposite sides of the cable and in the form of penetrating spray. The cable is all the while in motion—that is to say, the reason why the framework is made of separable members is that the apparatus may be directed around a cable without disturbing the movements of the latter. As the cable 26 passes between the bristles 27 of the brushes the lubricant is spread to better advantage and is caused to penetrate all the little interstices of the cable. A passage 32 is provided in the frame for the purpose of allowing any excess of lubricant to escape. The passage is closed while oiling, and the oil is afterward caught in a can or bucket.

The apparatus may be placed in position in a few minutes. It consists of very few parts, and the several adjustments just described enable it to be so used that the lubricant is applied both economically and effectually. The parts are all of simple construction and are readily replaced when worn out or broken.

Having thus described my invention, I claim as new and desire to secure by Letters Patent—

1. A cable-lubricator comprising a portable frame made in halves and provided with means for guiding a movable cable, each of said halves being provided with means for detachably connecting a nozzle therewith, a brush disposed within each half of the frame, and means for detachably securing said halves together.

2. A cable-lubricator comprising a hollow frame provided with a guideway for a cable, a pair of nozzles connected with said frame and disposed upon opposite sides of said cable, said nozzles being immediately adjacent to said cable, and means for forcing a lubricant through said nozzles and directly upon said cable.

3. A cable-lubricator comprising a hollow frame provided with a guideway for a cable, a pair of nozzles connected to said frame and disposed upon opposite sides of said cable, said nozzles being immediately adjacent to said cable, means for forcing the lubricant through said nozzles directly upon said cable, and brushes mounted within said frame and normally free to engage said cable.

4. A cable-lubricator comprising a hollow frame provided with means for guiding a movable cable and also provided with slots, a plurality of discharge-nozzles disposed within said frame, said discharge-nozzles being immediately adjacent to the path of said cable, and pipes passing through said slots and engaging said nozzles for violently projecting a lubricant through said nozzles directly upon said cable.

5. A cable-lubricator comprising a frame provided with means for guiding a movable cable, a pair of nozzles disposed adjacent to said cable and upon opposite sides thereof, each nozzle consisting of a tubular member provided with an educt and a deflecting-hood mounted upon said tubular member, a reservoir, and means for violently forcing said lubricant through said hollow members.

6. A cable-lubricator comprising a frame provided with means for guiding a movable cable, a pair of nozzles disposed adjacent to said cable and upon opposite sides thereof, each nozzle consisting of a tubular member provided with an educt and a deflecting-hood mounted upon said tubular member, means for adjusting said hood at different angles relatively to said educt, a reservoir, and means for violently forcing said lubricant into said tubular members.

In testimony whereof I have signed my name to this specification in the presence of two subscribing witnesses.

MICHAEL J. McGILL.

Witnesses:
JAMES DON,
PETER MARTIN.